A. V. CARROLL.
GEARING FOR LATHES.
APPLICATION FILED JUNE 3, 1909.
975,748.
Patented Nov. 15, 1910.
2 SHEETS—SHEET 2.
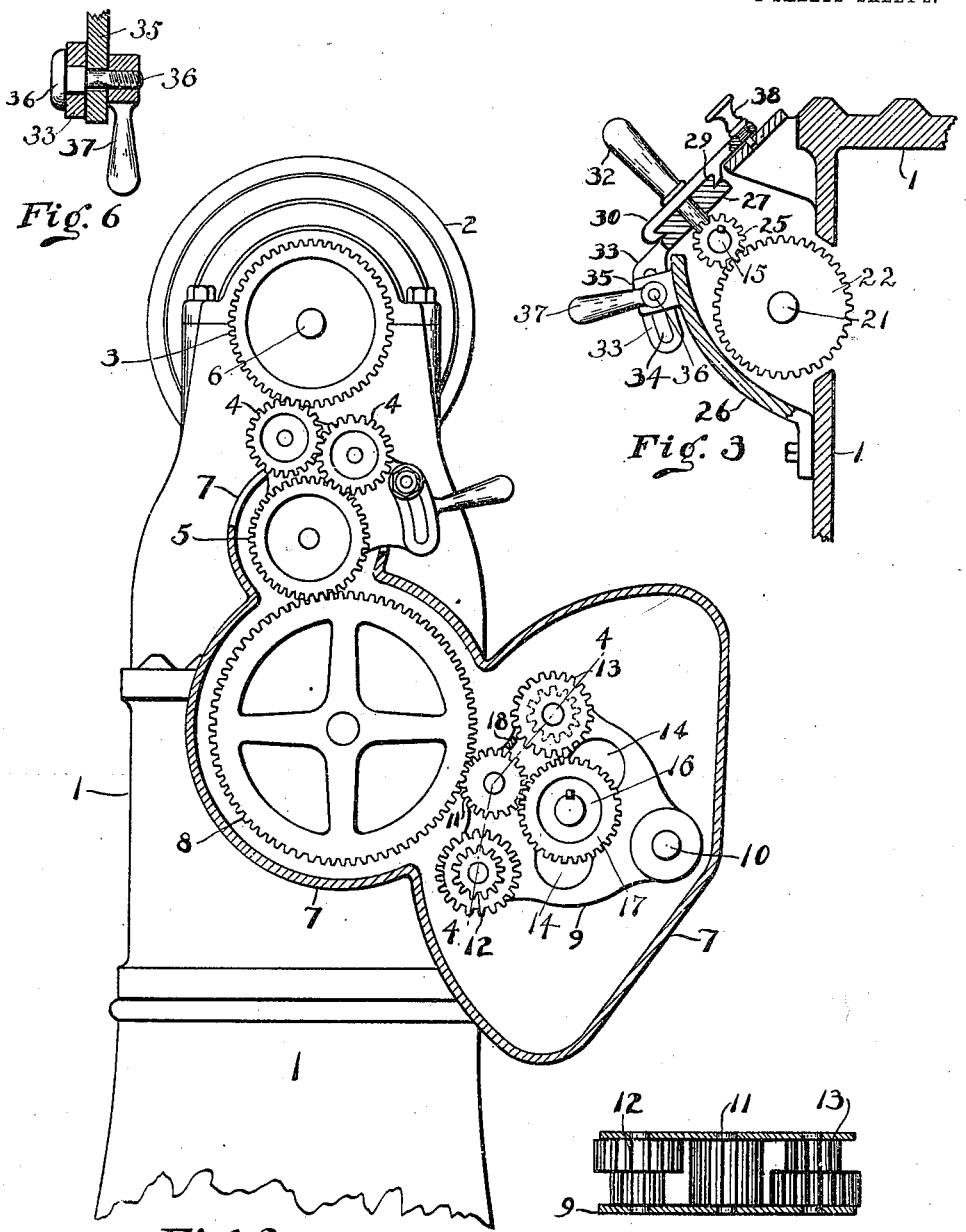
Fig. 6
Fig. 3
Fig. 2
Fig. 4
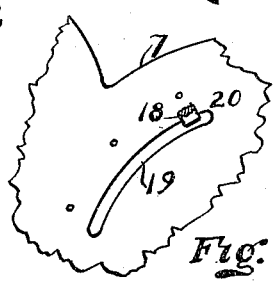
Fig. 7
Witnesses
N. W. Ransom
E. A. Seegers
Inventor
Arthur V. Carroll
By George B. Carrollon
Attorney

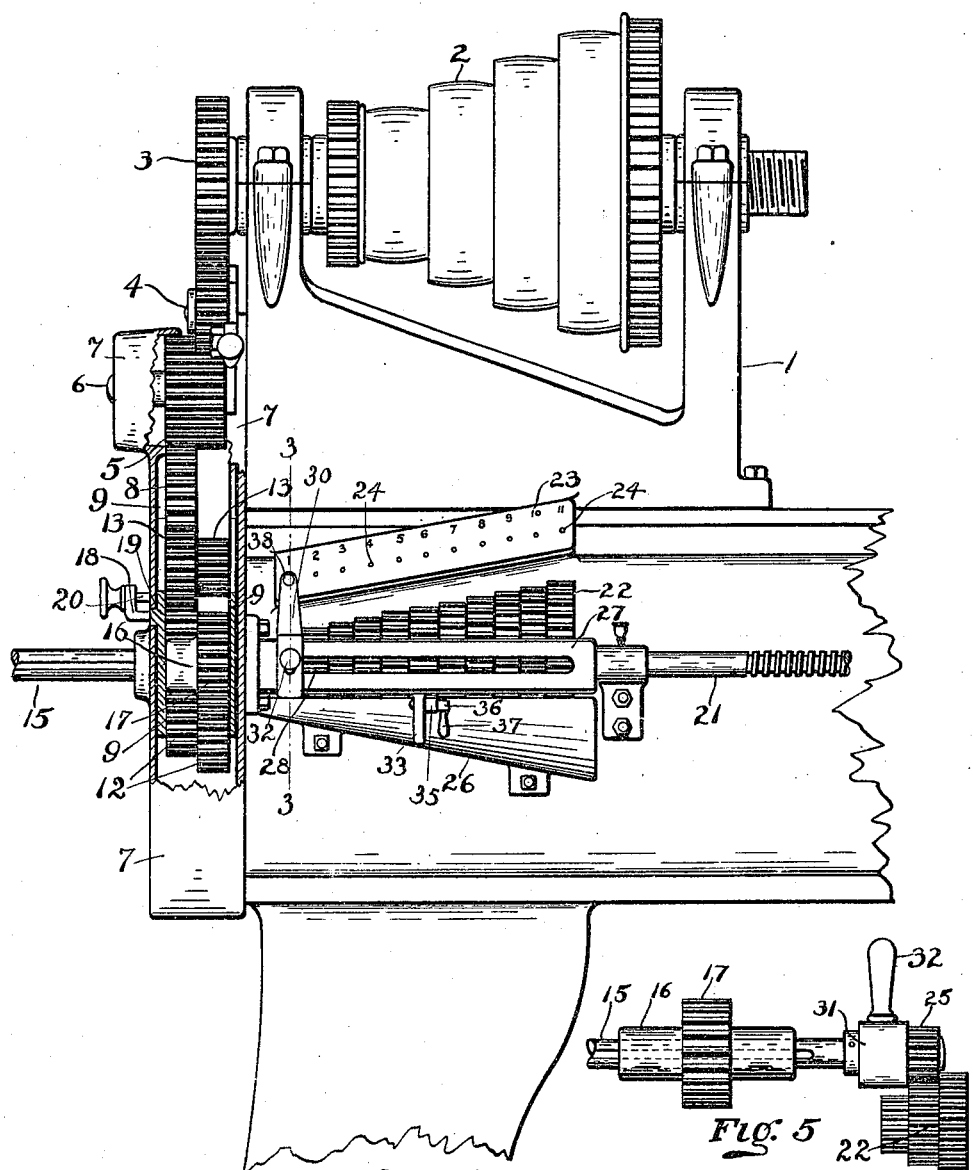

UNITED STATES PATENT OFFICE.

ARTHUR V. CARROLL, OF BATAVIA, OHIO.

GEARING FOR LATHES.

975,748.     Specification of Letters Patent.     Patented Nov. 15, 1910.

Application filed June 3, 1909. Serial No. 499,977.

*To all whom it may concern:*

Be it known that I, ARTHUR V. CARROLL, a citizen of the United States, residing at Batavia, in the county of Clermont and State of Ohio, have invented certain new and useful Improvements in Quick-Change Gearing for Lathes, of which the following is a specification.

The objects of my invention are to provide simple and efficient means for changing the speed of the lead screw to adapt it for different rates of feed; to provide means for instantaneously changing the speed of the lead screw; to provide means for changing the speed of the lead screw without stopping the lathe; and to provide speed changing gearing whereby the speed may be adjusted for cutting any standard thread without stopping the lathe.

My invention consists in the parts and combination and arrangement of parts hereinafter described and claimed.

In the drawings, Figure 1 is a side elevation of a lathe embodying my invention, a portion of a casing being broken away to show the interior mechanism; Fig. 2 an end view of the same, the casing being shown in section; Fig. 3 a section on the line 3—3 of Fig. 1; Fig. 4 a section on line 4—4 of Fig. 2; and Figs. 5, 6 and 7 details.

The reference numeral 1 denotes a lathe; 2 the usual head cone pulley, 3 a driving gear, 4, 4 reversing gears, 5 a driving gear mounted on a stud shaft 6, and 7 a swinging frame or casing pivoted on stud shaft 6. In the swinging casing are mounted a gear 8 and a segmental bracket 9. The gear 8 serves as the driving gear for the mechanism embodying my invention, and will for convenience, be referred to as the "driving gear," though, for some purposes of the invention it need not be a gear mounted in the swinging casing. The bracket 9 is pivoted at 10, carries at its free end an intermediate gear 11 and compound gear 12 and 13, 12 being a two to one gear, and 13 a one to two gear. Bracket 9 is provided, between its pivotal point and the gears, with a slot, or opening 14 which embraces a sliding shaft 15 and allows the bracket to swing relatively to the shaft. A sleeve 16, splined upon shaft 15, and held against longitudinal movement, carries a gear 17 mounted in a different plane from that of gear 8. The intermediate gear is so mounted that it may be brought into mesh with gears 8 and 17, but is of a size which enables it to pass between the two. Compound gear 12 is so mounted that, by swinging the bracket, its pinion may be brought into mesh with driving gear 8, and its spur into mesh with gear 17, and gear 13 is so mounted that its spur may be brought into mesh with driving gear 8 and its pinion into mesh with gear 17. It will be noted that, when the intermediate gear is in action, the speed imparted to shaft 15 is the same as if gear 17 was in direct engagement with gear 8; that, when compound gear 12 is in action, the speed of shaft 15 is doubled; and, when gear 13 is in action, the speed of shaft 15, is reduced one-half. An arm 18, fixed to the bracket 9, and extending through a curved slot 19 in the swinging casing 7, carries a spring pin 20 adapted to take into any of a series of holes A, B, C, in the casing. By withdrawing the pin and moving the arm 18, the bracket 9 may be swung to bring the intermediate gear, or either compound gear into mesh with gears 8 and 17, and the bracket may be locked in position by means of the spring pin.

Fixed to the lead screw 21 is a cone of gears 22, eleven in number, and above this cone is a plate 23 attached to the lathe frame and provided with a series of holes 24 corresponding in number and relative location with the gears in cone 22. These holes are preferably numbered 1, 2, 3 etc. The sliding shaft, 15, carries, at its inner end, a gear 25 adapted to mesh with and drive any of the gears in cone 22. Extending from the lathe frame is a guard 26, partly embracing the cone. Fixed to the swinging casing, and extending above the guard 26, is a plate 27 provided with a longitudinal slot 28, and a guide 29 upon which is mounted a carriage 30, gibbed to a box 31 upon the sliding shaft 15, and carrying a hand bar 32 which extends through slot 28. Extending downwardly from plate 27 is an arm 33 provided with a slot 34. A lug 35, extending from guard 26, carries a bolt 36 which takes through slot 34 and is engaged by a hand nut 37. The upper side of the carriage 30 extends over plate 23 and carries a threaded pin 38 adapted to take into any of the holes 24. When in its upward position, the handle of nut 37 locks the guard 26 and plate 27 in position, and, consequently locks the swinging frame 7 in position relatively to the lathe. By lowering the handle of nut 37, the lock is released and the swinging frame may be lifted, and pin 38 disengaged from the hole it occupies, thus leaving shaft 15 free to slide. By sliding the shaft 15, by means of hand bar 32, gear 25 may be brought opposite any desired gear in cone 22 and, when the swinging casing is lowered, brought into mesh therewith.

It will be noted that three changes of speed may be effected by means of the segmental bracket 9 and the double gears 12 and 13, and eleven changes by means of the sliding shaft 15 and the cone 22 or thirty changes in all, thus adapting the speed for all standard threads; and that all of these changes may be made practically instantaneously and without stopping the lathe; and that the construction requires but one chain of gearing between the lathe shaft and the lead screw.

For cutting threads not shown on the index, any desired gear may be substituted for gear 25 carried by the sliding shaft, and the threaded pin 38 adjusted to bring the swinging frame 7 into proper relation to the substituted gear and the cone.

I claim as my invention.

1. The combination of a driven shaft; a cone of gears fixed thereto; a frame; a gear mounted thereon; a casing pivoted concentrically therewith, a shaft mounted to slide in the casing; a gear fixed to the sliding shaft and adapted to engage with the gears of the cone; a gear mounted on and adapted to drive the shaft but held against movement longitudinally of the shaft; connections whereby said gear may be driven from the gear mounted on the frame; means for adjusting the casing and moving the sliding shaft to bring its fixed gear into mesh with any desired gear of the cone; and means for holding the casing and the sliding shaft in their adjusted positions.

2. The combination of a driven shaft; a cone of gears fixed thereto; a frame; a gear mounted thereon; a casing pivoted concentrically therewith; a driving gear mounted in the casing and adapted to be driven by the first mentioned gear; a shaft mounted to slide in the casing; a gear fixed to the sliding shaft and adapted to engage with the gears of the cone; a gear mounted on and adapted to drive the sliding shaft but held against movement longitudinally of the shaft; connections whereby said gear may be driven from the driving gear; means for adjusting the casing and sliding the shaft to bring its fixed gear into mesh with any desired gear in the cone; and means for holding the casing and the sliding shaft in their adjusted positions.

3. The combination of a driven shaft; a cone of gears fixed thereto; a frame; a gear mounted thereon; a casing pivoted concentrically therewith; a driving gear mounted in the casing and adapted to be driven by the gear on the frame; a shaft slidably mounted in the casing; a gear fixed to the shaft and adapted to engage with the gears of the cone, a gear sleeved and splined on, and adapted to drive the shaft; a bracket pivotally mounted in the casing, having a slot or opening embracing the shaft and movable relatively to the driving gear and the gear which drives the sliding shaft; compound gears so mounted on the bracket that one member of each compound gear may be brought into mesh with the driving gear, and the other member into mesh with the gear which drives the sliding shaft; means for moving the bracket to bring the desired gear into engagement; means for holding the bracket in its adjusted positions; means for adjusting the casing and sliding the shaft to bring its fixed gear into mesh with any desired gear of the cone; and means for holding the casing and the shaft in their adjusted positions.

4. The combination of a driven shaft; a cone of gears fixed thereto; a frame; a gear mounted thereon; a casing pivoted concentrically therewith; a driving gear mounted in the casing and adapted to be driven by the gear on the frame; a shaft slidably mounted in the casing; a gear fixed to the shaft and adapted to engage with the gears of the cone, a gear sleeved and splined on, and adapted to drive, the shaft; a bracket pivotally mounted in the casing, having a slot or opening embracing the shaft and movable relatively to the driving gear and the gear which drives the sliding shaft; an intermediate gear, and compound gears mounted on the bracket; means for moving the bracket to bring the intermediate gear or either compound gear into mesh with the driving gear and the gear which drives the sliding shaft; means for holding the bracket in its adjusted positions; means for adjusting the casing and sliding the shaft to bring its fixed gear into mesh with any desired gear of the cone; and means for holding the casing and the shaft in their adjusted positions.

5. The combination of a driven shaft; a cone of gears fixed thereto; a frame; a gear mounted thereon; a casing pivoted concentrically therewith; a shaft mounted to slide in the casing; a gear fixed to the sliding shaft and adapted to engage with the gears of the cone; a gear sleeved and splined to and adapted to drive the sliding shaft; connections whereby said gear may be driven by the gear on the frame; a plate mounted on the frame, adjacent to the cone, and having a series of holes corresponding in number and position to the gears on the cone; a plate fixed to the casing; a carriage mounted to travel on said plate and attached to the sliding shaft; a pin adapted to engage the carriage with selected holes in the plate attached to the frame; and means for lifting the casing and moving the carriage.

6. The combination of a driven shaft; a cone of gears fixed thereto; a frame; a gear mounted thereon; a casing pivoted concentrically therewith; a shaft mounted to slide in the casing; a gear fixed to the sliding shaft and adapted to engage with the gears of the cone; a gear sleeved and splined to and adapted to drive the sliding shaft; connections whereby said gear may be driven by the gear on the frame; a plate mounted on the frame, adjacent to the cone, and having a series of holes corresponding in number and position to the gears on the cone; a plate fixed to the casing; a carriage mounted to travel on said plate and attached to the sliding shaft; a pin adapted to engage the carriage with selected holes in the plate attached to the frame; means for lifting the casing and moving the carriage; a guard extending from the frame and means for locking the guard to the carriage.

ARTHUR V. CARROLL.

Witnesses:
P. A. JAMIESON,
FRANK DAVIS, Jr.